(12) United States Patent
Hemmersmeier

(10) Patent No.: US 7,766,418 B2
(45) Date of Patent: Aug. 3, 2010

(54) MOUNTING STRUCTURE WITH A FRAME-SHAPED CONSTRUCTION

(75) Inventor: Ralf Hemmersmeier, Lippstadt (DE)

(73) Assignee: HBPO GmbH (DE)

( * ) Notice: Subject to any disclaimer, the term of this patent is extended or adjusted under 35 U.S.C. 154(b) by 0 days.

(21) Appl. No.: 11/917,525

(22) PCT Filed: Jun. 20, 2006

(86) PCT No.: PCT/EP2006/005907

§ 371 (c)(1),
(2), (4) Date: Dec. 14, 2007

(87) PCT Pub. No.: WO2006/136371

PCT Pub. Date: Dec. 28, 2006

(65) Prior Publication Data

US 2008/0203766 A1    Aug. 28, 2008

(30) Foreign Application Priority Data

Jun. 21, 2005   (DE) .................. 10 2005 028 834

(51) Int. Cl.
*B62D 25/08*   (2006.01)
(52) U.S. Cl. .................. 296/193.1; 296/187.09; 296/203.02; 180/68.4
(58) Field of Classification Search ........... 296/187.09, 296/193.09, 193.1, 203.02; 180/68.4, 68.6
See application file for complete search history.

(56) References Cited

U.S. PATENT DOCUMENTS

| | | | | |
|---|---|---|---|---|
| 5,190,803 A | * | 3/1993 | Goldbach et al. | 428/138 |
| 6,547,317 B1 | * | 4/2003 | Cheron et al. | 296/193.01 |
| 6,679,545 B1 | * | 1/2004 | Balzer et al. | 296/193.09 |
| 6,814,400 B2 | * | 11/2004 | Henderson et al. | 296/193.09 |
| 6,955,393 B2 | * | 10/2005 | Staargaard et al. | 296/193.1 |
| 7,377,579 B2 | * | 5/2008 | Kwon | 296/193.09 |
| 2002/0060476 A1 | * | 5/2002 | Cantineau et al. | 296/194 |

(Continued)

FOREIGN PATENT DOCUMENTS

DE    19850589    5/2000

(Continued)

OTHER PUBLICATIONS

International Search Report, PCT/EP2006/005907, EPO, Sep. 7, 2006.

*Primary Examiner*—Jason S Morrow
(74) *Attorney, Agent, or Firm*—Bourque and Associates

(57) ABSTRACT

A mounting structure for the front end of a car or small truck has a frame-shaped structure that surrounds an air cooled pass-through area and exhibits an upper crossmember, a lower crossmember and sidemembers connecting them. The upper crossmember is designed as a closed wall for receiving a hood lock and forms a sealing rib that borders on the air cooled pass-through area for an air-blocking connection of a radiator component. To provide the upper crossmember as the lock crossmember at the mounting structure with a high moment of inertia and to reduce the air cooled pass-through area only to a negligible degree, the upper crossmember is strutted using a lattice structure that is adjacent to the sealing rib and protrudes into the air cooled pass-through area, where the lattice openings form a part of the air cooled pass-through area with their entire opening area.

7 Claims, 2 Drawing Sheets

U.S. PATENT DOCUMENTS

| | | | |
|---|---|---|---|
| 2003/0178235 A1* | 9/2003 | Cheron et al. | 180/68.1 |
| 2004/0160088 A1* | 8/2004 | Staargaard et al. | 296/193.09 |
| 2005/0040672 A1* | 2/2005 | Andre | 296/187.09 |
| 2005/0229530 A1* | 10/2005 | Schmidt et al. | 52/720.1 |
| 2005/0252704 A1* | 11/2005 | Kim | 180/68.4 |
| 2005/0253419 A1* | 11/2005 | Kwon | 296/193.09 |
| 2005/0275248 A1* | 12/2005 | Lee | 296/193.09 |
| 2008/0308333 A1* | 12/2008 | Kapadia et al. | 180/68.4 |

FOREIGN PATENT DOCUMENTS

| | | |
|---|---|---|
| EP | 1484216 | 12/2004 |

* cited by examiner

US 7,766,418 B2

MOUNTING STRUCTURE WITH A FRAME-SHAPED CONSTRUCTION

TECHNICAL FIELD

The invention relates to a mounting structure or frame for frontend modules of passenger cars and small trucks.

BACKGROUND INFORMATION

Passenger cars and small trucks generally include a front end mounting structure which serves as the central installation platform for a frontend module of passenger cars or small trucks onto which the various individual components of the frontend module are attached in a preassembly step. Because motor vehicles of the kind included here have similar support structures, frame-shaped mounting structures are used throughout and assume air guiding and air sealing functions for the necessary radiator components. This is accomplished with the sealing rib located at the crossmember of the mounting structure and adjacent to the air cooled pass-through area surrounded by the mounting structure.

In most cases, the upper crossmember of the mounting structure is designed for receiving the hood lock of the respective motor vehicle, where a secure locking of the vehicle's front hood is essential. Even during regular driving operation, large external forces acting upon the hood must be introduced into the crossmember of the mounting structure from where they are diverted via the mounting structure into the support structure of the motor vehicle. In this process, only very small elastic deformations may occur in the upper crossmember of the mounting structure, which must be dimensioned sufficiently with regard to stiffness and strength.

Under extreme loads at a crash situation of the vehicle, even greater forces must be absorbed by the mounting structure via the hood lock, which for safety reasons must not lead to a breakaway hood lock from the mounting structure.

Accordingly, the upper crossmember of the mounting structure, which serves as the lock crossmember, must be provided with a moment of inertia. This applies regardless of whether the upper crossmember is designed as a purely synthetic component or as a hybrid component made of a metal-synthetics composite. The problem in this situation is that a sufficient stiffness of the crossmember with simultaneously desired weight reduction can be achieved only through a greater construction height in the main load direction. Especially in cases where a center brace for supporting the upper crossmember at the lower crossmember is to be avoided, the resultant construction height of the crossmember even with favorable profile shapes is such that it leads to covering of the upper parts of the radiator components and in so doing reduces the theoretically possible heat transfer surface.

SUMMARY OF THE INVENTION

It is, therefore, one objective of the invention to create a mounting structure whose upper crossmember as the lock crossmember exhibits a great moment of inertia and reduces the air cooled pass-through area only to a negligible extent.

This objective is achieved by a mounting structure having an increased moment of inertia and strength wherein the moment of inertia can be increased significantly in the upper region of the mounting structure through a lattice structure that is located adjacent to the lower side of the upper crossmember and that can also be referred to as a lattice support frame with truss framework character. In this manner, the upper crossmember of the mounting structure is divided into an upper closed part that ends with the sealing rib, and a lower part that exhibits a high portion of open flow-through area that can be used for the pass-through of the cooling air. For example, the region of the upper crossmember of the mounting structure with the lattice structure can be arranged with its full area in front of one of the radiator components, whereby the lattice structure is designed such that the loss of efficiency that occurs at this radiator component is negligible.

BRIEF DESCRIPTION OF THE FIGURES

Following, the invention is described in greater detail based on an exemplary embodiment and the drawing, of which.

DETAILED DESCRIPTION OF THE PREFERRED EMBODIMENTS

Figure 1:
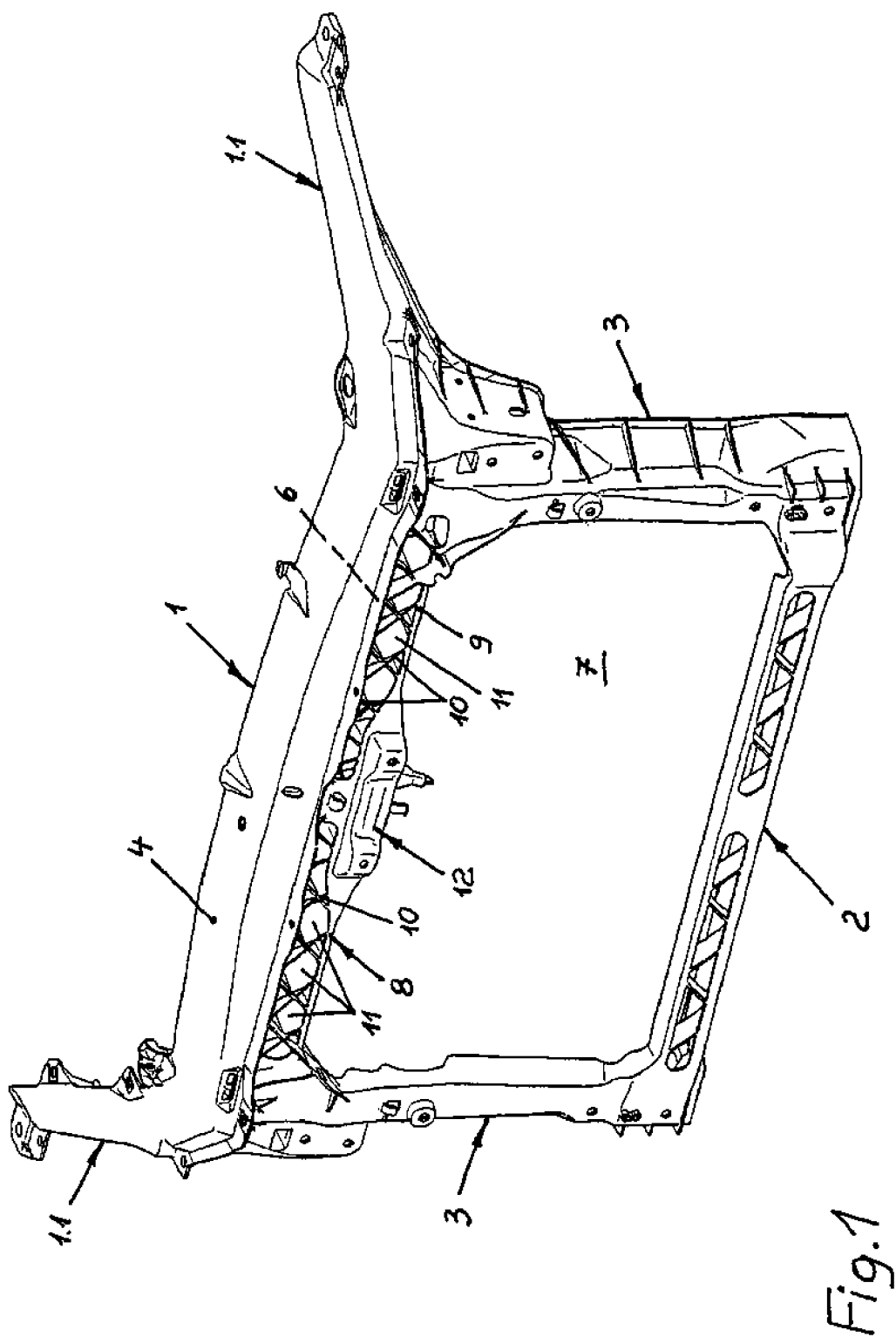
FIG. 1 shows a perspective front view of a mounting structure.
Figure 2:
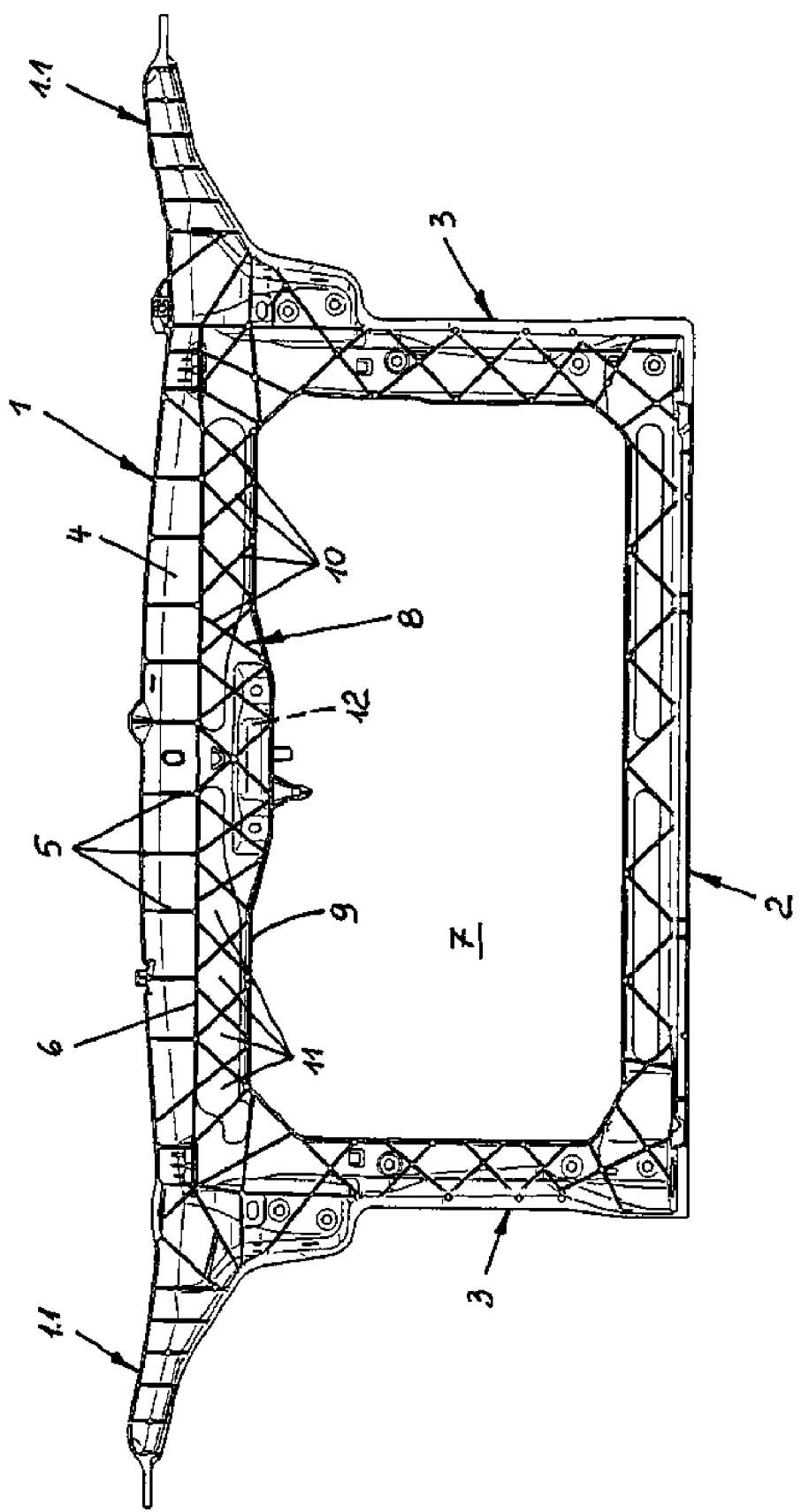
FIG. 2 shows a rear view of the mounting structure according to FIG. 1.

In detail, the mounting structure shown in the drawing includes an upper crossmember 1, a lower crossmember 2 and sidemembers 3 that connect the upper crossmember 1 to the lower crossmember 2 with one piece. As a result, the mounting structure has the basic structure of an essentially rectangular frame, whereby mounting arms 1.1 protrude from the two upper frame corners at an angle toward the back from which the upper crossmember 1 proceeds.

The upper crossmember 1 is a profile carrier exhibiting a U-shaped or C-shaped cross-section with its open side being located at the rear side of the mounting structure. In the direction of the front side of the mounting structure, the upper crossmember 1 is provided with a closed wall 4 with bracing bars 5 extending from its rear side in the hollow profile of the upper crossmember 1. The crossmember can be designed as a fully synthetic component, in the preferred design it is a hybrid component of bracing components made of a rigid material such as metal and a synthetic material sprayed onto it. In this case, the wall 4 of the upper crossmember 1 is built in hybrid design while the bracing bars 5 are made exclusively of the cast synthetic. The lower bar of the profile carrier that forms the crossmember 1 and that protrudes toward the rear forms a sealing rib 6 that has at least one radiator component of the respective vehicle attached to it such that in the connection zone between the upper crossmember 1 of the mounting structure and this radiator component there is no air cooled bypass that bypasses the radiator component. In this manner, the sealing rib 6 defines toward the top an air cooled pass-through area 7, which is furthermore enclosed by the lower crossmember 2 and the sidemembers 3 of the mounting structure.

In the area of the sealing rib 6, a lattice structure 8 follows the upper crossmember 1 of the mounting structure toward the bottom and protrudes into the air cooled pass-through area 7 and in the installation position of the mounting structure at the inflow side is located in front of the at least one radiator components of the motor vehicle. The lattice structure 8 consists of a bar 9 that runs at a distance from the sealing rib 6 of the upper crossmember 1 and that is connected to the sealing rib 6 via interim bars 10. The interim bars 10 are designed in pairs as bars that cross each other and just like bar 9, they are in the shape of flat bars. In the direction of their width, the interim bars 10 as well as the bar 9 are positioned in the direction of the flow of the air cooled that is to pass through the lattice structure 8 and passes through the lattice openings 11 between the bars 9, 10. The total opening area of these lattice openings 11 is part of the air cooled pass-through area 7. Dimensions and shapes of the bars 9, 10 result in minimal flow resistance for the cooling air, such that the loss on cooling performance of the radiator components, although essentially unavoidable due to the lattice structure 8 in front of them, is negligible.

With the design of the upper crossmember 1 as a hybrid component, the synthetic material that is sprayed onto the bracing components, made of the more rigid material forms the interim bars 10 and the lower end bar 9 of the lattice structure 8. The lattice structure may be connected with the sidemembers 3 in the corner area of the mounting frame for additional stiffening of the upper crossmember 1, which requires that the lattice structure 8 extends across the entire length of the upper crossmember 1. Fundamentally, the upper crossmember 1 can also exhibit the lattice structure 8 at the bottom side only in partial areas for support, as can be provided at support frames with a truss framework structure.

The lattice structure 8 at the bottom side of the upper crossmember 1 of the mounting structure has the function of a support frame in order to increase the carrying capacity of the upper crossmember 1. This measure is necessary with regard to the fact that the upper crossmember 1 holds the lock for locking the front hood of the respective vehicle. In this manner, receiving devices 12 can be located in the area of the lattice structure 8 for the hood lock, which can be integrated in the lattice structure 8.

The present invention is not intended to be limited to a device or method which must satisfy one or more of any stated or implied objects or features of the invention and should not be limited to the preferred, exemplary, or primary embodiment(s) described herein. Modifications and substitutions by one of ordinary skill in the art are considered to be within the scope of the present invention, which is not to be limited except by the allowed claims and their legal equivalents.

The invention claimed is:

1. A mounting structure for front end modules of passenger cars or small trucks, said mounting structure having a frame-shaped structure that surrounds an air cooled pass-through area and includes an upper crossmember, a lower crossmember and sidemembers that connect said upper and lower crossmembers, whereby the upper crossmember is designed as a profile carrier with a closed wall for receiving a hood lock and wherein said wall forms a sealing rib that borders on the air cooled pass-through area for an air-blocking connection to a radiator component, wherein the upper crossmember is strutted using a lattice structure that is adjacent to the sealing rib and protrudes into the air cooled pass-through area, wherein the lattice structure consists of a bar that runs at a distance from the sealing rib of the upper crossmember and of interim bars that connect this bar with the sealing rib, and wherein lattice openings formed in said lattice structure form a part of the air cooled pass-through area with their entire opening area.

2. A mounting structure as set forth in claim 1, wherein the bar and the interim bars of the lattice structure are in the shape of flat bars having a width direction, and wherein their width directions are oriented in the same direction as the air cooled pass-through.

3. A mounting structure as set forth in claim 1, wherein the interim bars of the lattice structure are formed in pairs that cross each other.

4. A mounting structure as set forth in claim 1, wherein the lattice structure extends across the entire length of the upper crossmember.

5. A mounting structure as set forth in claim 1, wherein receiving devices for the hood lock are integrated in the lattice structure.

6. The mounting structure of claim 1, wherein at least the upper crossmember is designed as a hybrid component made of bracing components of a rigid material and a synthetic material sprayed onto it, and wherein the lattice structure is made exclusively of the sprayed-on synthetic material.

7. A mounting structure as set forth in claim 1, wherein the upper crossmember is designed as a profile carrier and exhibits a U-shaped or C-shaped cross-section, whereby the open side of the U-profile, or of the C-profile is arranged in the direction of the outflow of the air cooled pass-through and wherein a bar, which is situated adjacent the air cooled pass-through area, is connected to the lattice structure by means of interim bars.

* * * * *